United States Patent
Zhang et al.

(10) Patent No.: US 9,439,116 B2
(45) Date of Patent: Sep. 6, 2016

(54) SYSTEM AND METHOD FOR IDENTIFYING A SUBSCRIBER IN A NETWORK ENVIRONMENT

(71) Applicant: CISCO TECHNOLOGY, INC., San Jose, CA (US)

(72) Inventors: Yuyong Zhang, Nashua, NH (US); Mark Grayson, Maidenhead (GB); Anton Okmyanskiy, Vancouver (CA); Swaminathan A. Anantha, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 101 days.

(21) Appl. No.: 14/281,213

(22) Filed: May 19, 2014

(65) Prior Publication Data
US 2015/0334615 A1 Nov. 19, 2015

(51) Int. Cl.
| | |
|---|---|
| H04W 36/04 | (2009.01) |
| H04W 64/00 | (2009.01) |
| H04W 36/00 | (2009.01) |
| H04W 4/08 | (2009.01) |
| H04W 8/08 | (2009.01) |
| H04W 76/02 | (2009.01) |

(52) U.S. Cl.
CPC .............. *H04W 36/04* (2013.01); *H04W 4/08* (2013.01); *H04W 8/08* (2013.01); *H04W 36/0016* (2013.01); *H04W 64/003* (2013.01); *H04W 76/021* (2013.01)

(58) Field of Classification Search
CPC .................................................... H04W 36/04
See application file for complete search history.

(56) References Cited

U.S. PATENT DOCUMENTS

| | | | | |
|---|---|---|---|---|
| 8,666,407 B2 * | 3/2014 | Vikberg | ............. | H04W 76/027 455/433 |
| 2011/0019612 A1 | 1/2011 | Grayson et al. | | |
| 2011/0183675 A1 * | 7/2011 | Bae | ........................ | H04W 36/04 455/436 |
| 2012/0039250 A1 | 2/2012 | Li et al. | | |
| 2012/0108244 A1 * | 5/2012 | Shi | .................... | H04W 36/0022 455/438 |

(Continued)

FOREIGN PATENT DOCUMENTS

| | | |
|---|---|---|
| CN | 105101160 | 11/2015 |
| EP | 2947903 | 11/2015 |

OTHER PUBLICATIONS

"TR-069 CPE WAN Management Protocol," Issue 1 Amendment 4; Issue Date: Jul. 2011, Protocol Version 1.3, Broadband Forum Technical Report.

(Continued)

*Primary Examiner* — Jason Mattis
(74) *Attorney, Agent, or Firm* — Patent Capital Group

(57) ABSTRACT

An example method is provided in one example embodiment and includes receiving, by a first Home eNodeB (HeNB), a first attach request from a user equipment (UE) for attaching a subscriber associated with the UE to a small cell network; determining whether the subscriber has transitioned into the small cell network from a macro cell network; exchanging, based on the determination, a first pair of messages between the first HeNB and the UE to determine an International Mobile Subscriber Identity (IMSI) of the subscriber; and exchanging, based on the determination, one or more second pairs of messages between the first HeNB and the UE to advance a sequence number for Non-Access Stratum (NAS) messages for the UE to a value corresponding to a received sequence number for the first attach request from the UE.

18 Claims, 8 Drawing Sheets

(56) References Cited

U.S. PATENT DOCUMENTS

| | | | |
|---|---|---|---|
| 2012/0178416 A1 | 7/2012 | Miklos et al. | |
| 2013/0045742 A1 | 2/2013 | Vikberg et al. | |
| 2013/0188604 A1 | 7/2013 | Chin et al. | |
| 2014/0106790 A1 | 4/2014 | Kakinada et al. | |
| 2014/0315557 A1* | 10/2014 | Ganapathy | H04W 36/0055 455/438 |
| 2015/0282236 A1* | 10/2015 | Chai | H04W 76/02 370/329 |

OTHER PUBLICATIONS

"TR-196 Femto Access Point Service Data Model," Issue 2, Issue Date: Nov. 2011, Broadband Forum Technical Report.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (EGPP TS 23.401 version 9.5.0 Release 9);" © European Telecommunication Standards Institute 2010; Jun. 2010, 261 pages.

"ETSI TS 124 007 V9.0.0 (Jan. 2010) Technical Specification: Digital cellular telecommunications system (Phase 2+); Universale Mobile Telecommunications System (UMTS); LTE; Mobile radio interface signaling layer 3; General Aspects (3GPP TS 24.007 version 9.0.0 Release );" © European Telecommunication Standards Institute 2010; Jan. 2010, 151 pages.

"ETSI TS 125 469 V9.3.0 (Oct. 2010) Technical Specification; Universal Mobile Telecommunications System (UMTS); UTRAN Iuh interface Home Node B (HNB) Application Part (HNBAP) signaling (3GPP TS 25, 469 version 9.3.0 Release 9);" © European Telecommunication Standards Institute 2010; Oct. 2010; 64 pages.

"ETSI TS 133 401 V8.8.0 (Jun. 2011) Technical Speciciation: Digital cellular telecommunications systems (Phase 2+); Universal Mobile Telecommunications System (UMTS); LTE; 3GPP System Architecture Evolution (SAE); Security architecture (3GPP TS 33.401 version 8.8.0 Release 8);" © European Telecommunication Standards Institute 2011; Jun. 2011; 101 pages.

"ETSI TS 136 401 V8.6.0 (Jul. 2009) Technical Specification: LTE; Evolved Universal Terrestrial Radio Access Network (E-UTRAN); Architecture description (3GPP TS 36.401 version 86.0 Release 8);" © European Telecommunication Standards Institute 2009; Jul. 2009, 21 pages.

ETSI TS 136 413 V8.10.0 (Jun. 2010) Technical Specification: LTE; Evolved Universal Terrestrial Radio Access Network (E-UTRAN); S1 Application Protocol (S1AP) (3GPP TS 36413 version 8.10.0 Release 8); © European Telecommunication Standards Institute 2010; Jun. 2010, 220 pages.

EPO Oct. 13, 2015 Extended Search Report and Opinion from European Application Serial No. EP15160611.

Alcatel-Lucent et al., "Verification of HNB Identity," 3GPP Draft: R3-121967, HNBVERIF_467CR, 3$^{rd}$ Generation Partnership Project (3GPP), 3GPP TSG-RAN WG3 Meeting #77, Qingdao, China, Aug. 13-17, 2012.

Nokia Siemens Networks et al., "Cleanup and small corrections of 25.467 before Rel-10 closure," 3GPP Draft, R3-111793, 3$^{rd}$ Generation Partnership Project (3GPP), 3GPP TSG-RAN WG3 Meeting #72, Barcelona, Espana, May 9-13, 2011.

\* cited by examiner

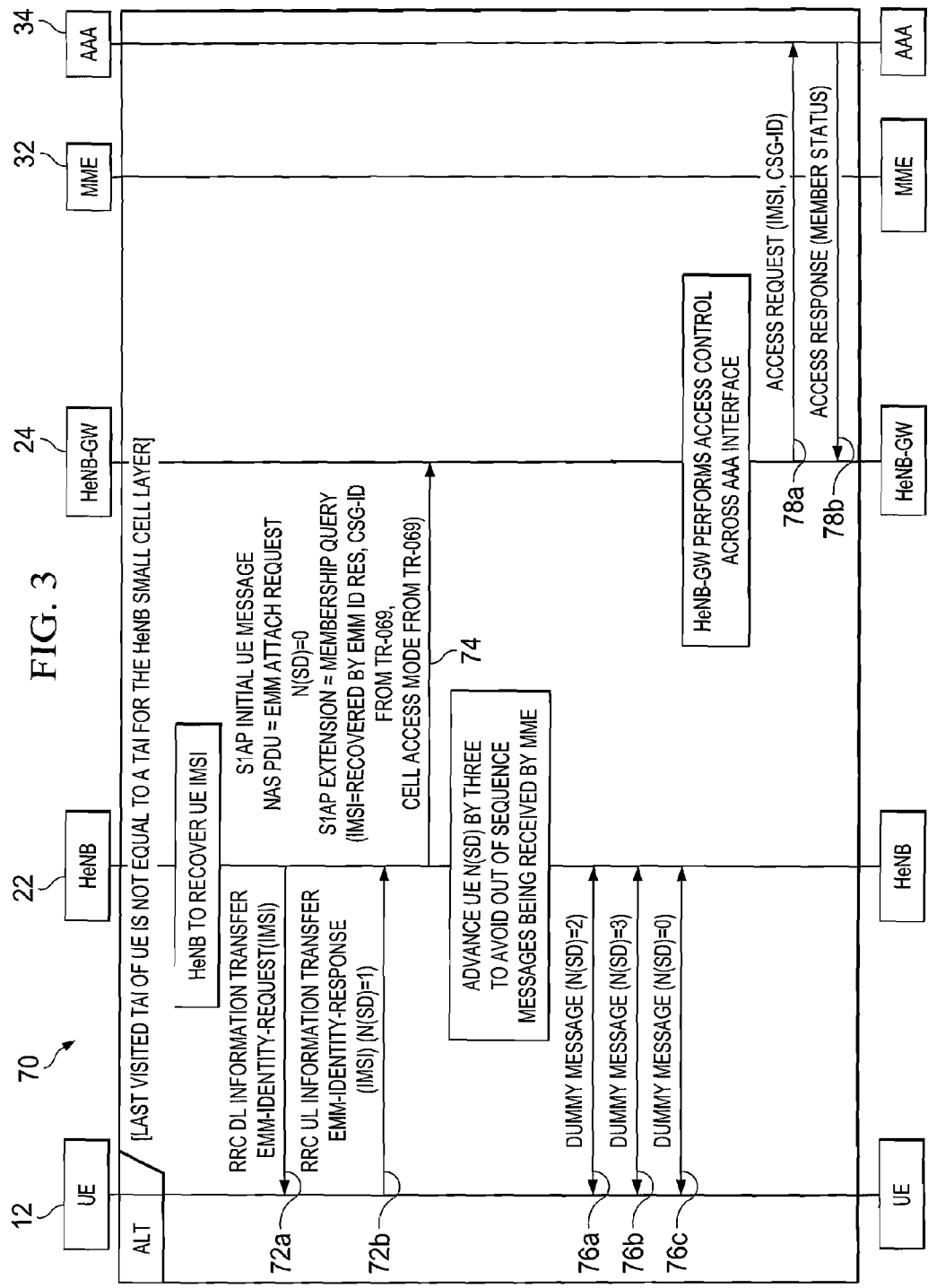

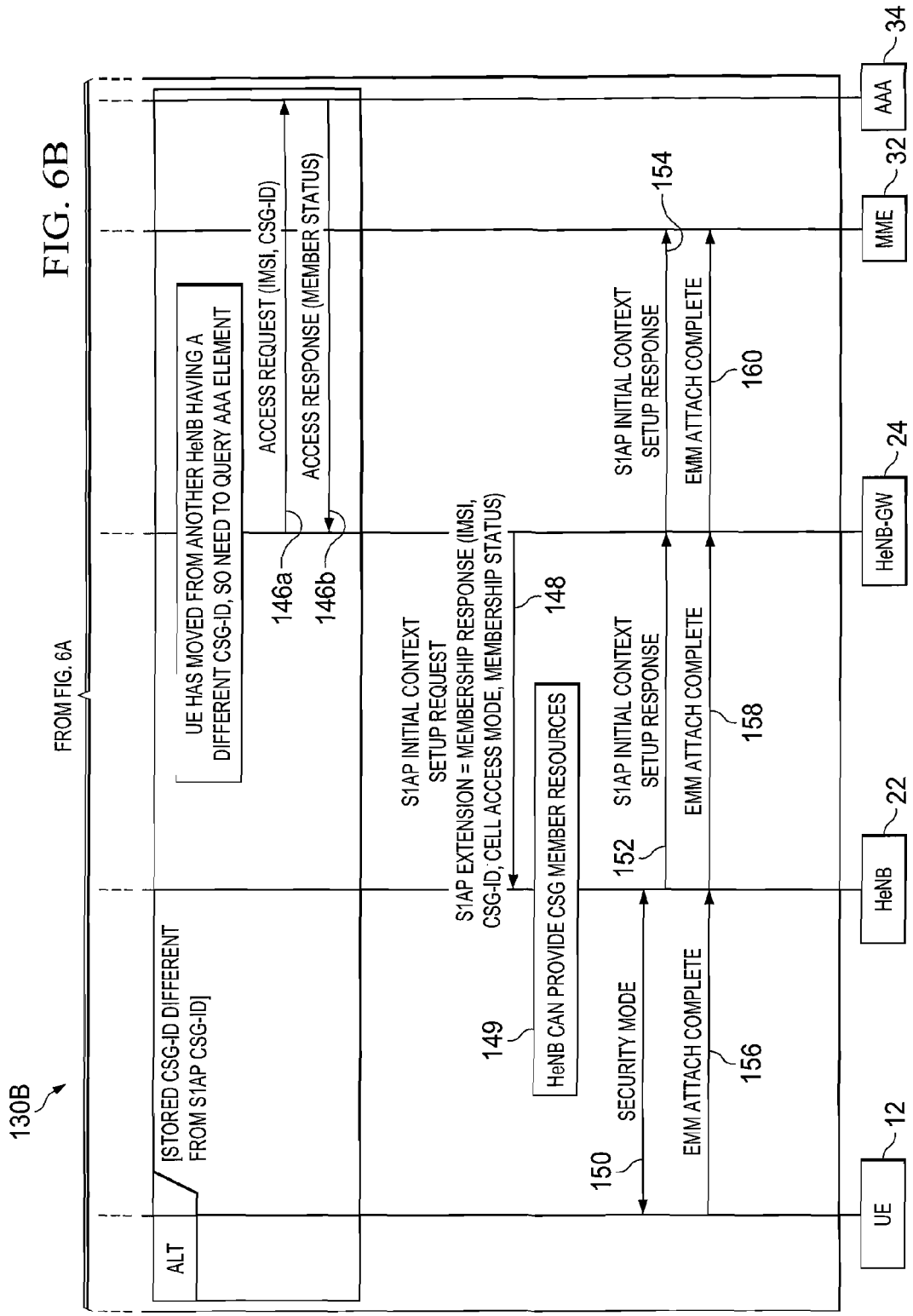

SYSTEM AND METHOD FOR IDENTIFYING A SUBSCRIBER IN A NETWORK ENVIRONMENT

TECHNICAL FIELD

This disclosure relates in general to the field of communications and, more particularly, to a system and method for identifying a subscriber in a network environment.

BACKGROUND

Networking architectures have grown increasingly complex in communication environments. For example, small cells have gained notoriety due to their capabilities to connect wireless devices to a network. In general terms, small cell access points can operate in a licensed spectrum to connect user equipment to the network, often using broadband connections. For a mobile operator, small cell access points can offer improvements to both coverage and capacity, which is particularly applicable to indoor networking environments where macro cell networks typically suffer coverage limitations. Small cell access points can also offer an alternative networking architecture to deliver the benefits of scalable small cell deployments. However, there are significant challenges in managing access to small cell access points, particularly in the context of subscribers transitioning from a macro cell layer into a small cell network layer.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flow diagram illustrating other example flows and activities associated with identifying a subscriber in a network environment in accordance with one potential embodiment of the present disclosure;

FIGS. 6A-6B are simplified flow diagrams illustrating yet other example flows and activities associated with identifying a subscriber in a network environment in accordance with one potential embodiment of the present disclosure.

DETAILED DESCRIPTION OF EXAMPLE EMBODIMENTS

Overview

Figure 1:
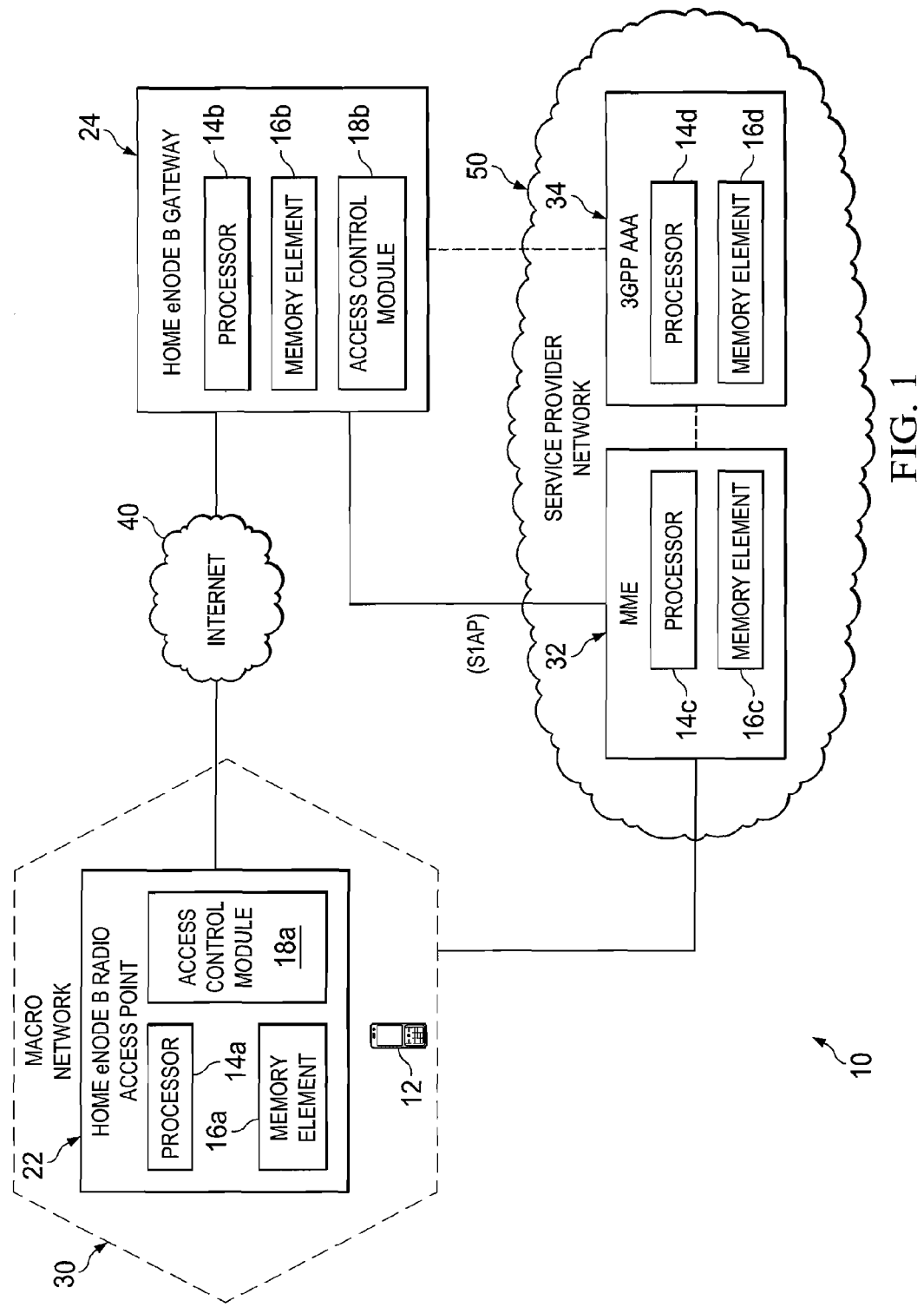
FIG. 1 is a simplified block diagram illustrating a communication system to facilitate identifying a subscriber in a network environment according to one embodiment of the present disclosure.

A method for a communication network is provided in one example embodiment and may include receiving, by a first Home eNodeB (HeNB), a first attach request from a user equipment (UE) for attaching a subscriber associated with the UE to a small cell network; determining whether the subscriber has transitioned into the small cell network from a macro cell network; exchanging, based on the determination, a first pair of messages between the first HeNB and the UE to determine an International Mobile Subscriber Identity (IMSI) of the subscriber; and exchanging, based on the determination, one or more second pairs of messages between the first HeNB and the UE to advance a sequence number for Non-Access Stratum (NAS) messages for the UE to a value corresponding to a received sequence number for the first attach request from the UE. In some cases, the first pair of messages and the one or more second pairs of messages can include an Evolved Packet System Mobility Management Identity (EMM-ID) Request message; and an EMM-ID Response message. In one instance, the determining that the subscriber has transitioned into the small cell network from the macro cell network includes determining that a source tracking area identity (TAI) for the subscriber does not match a corresponding TAI provisioned for the first HeNB.

In some cases the first HeNB can be provisioned, at least in part, to provide resources for a closed subscriber group (CSG). In some instances the method may further comprise: determining whether the subscriber is a member of the CSG by performing at least one of: querying a service with the IMSI of the subscriber and an identifier for the CSG to determine if the subscriber is a member of the CSG; querying a service with the IMSI of the subscriber and an identifier for the first HeNB to determine if the subscriber is a member of the CSG; and comparing the IMSI of the subscriber to a list of authorized subscribers for the CSG. In one case, the method may further comprise communicating to the first HeNB whether the subscriber is a member of the CSG to provide resources to the subscriber, wherein the resources provided to the subscriber can be adjusted based on an access mode of the first HeNB and whether the subscriber is a member of the CSG. In yet other cases, the method may further comprise associating the IMSI of the subscriber with a Globally Unique Mobility Management Entity Identity (GUMMEI) and a Mobility Management Entity UE S1AP Identity (MME UE S1AP ID) for the subscriber if the subscriber is a member of the CSG; and storing the association of the IMSI in combination with an identifier for the CSG.

In other instances, the method may further comprise receiving, by a second HeNB, a second attach request from the UE for attaching the subscriber to the small cell network; determining whether the subscriber has transitioned to the second HeNB from another HeNB in the small cell network; and retrieving, by a Home eNodeB gateway (HeNB-GW), the IMSI of the subscriber by recovering an association of the IMSI with a Globally Unique Mobility Management Entity Identity (GUMMEI) and a Mobility Management Entity UE S1AP Identity (MME UE S1AP ID) for the subscriber if the subscriber has transitioned to the second HeNB from another HeNB in the small cell network. In some cases, the determining that the subscriber has transitioned to the second HeNB from another HeNB in the small cell network can include matching a source tracking area identity (TAI) for the subscriber to a corresponding TAI provisioned for the small cell network.

Example Embodiments

Turning to FIG. 1, FIG. 1 is a simplified block diagram illustrating a communication system 10 to facilitate identifying a subscriber in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

The example architecture of FIG. 1 may include user equipment (UE) 12, a Home eNode B (HeNB) radio access point 22, which may have a logical connection to an HeNB gateway (HeNB-GW) 24, a macro network 30, an internet 40 and a service provider network 50. Service provider network 50 may include a Mobility Management Entity (MME) 32 and a 3GPP Authentication, Authorization and Accounting (AAA) element 34. MME 32 may interface with HeNB-GW 24 and HeNB 22 over an S1 application protocol (S1AP) interface and may further be configured to interface with AAA element 34, typically through a Home Subscriber Server (not shown). MME 32 may further be configured with one or more logical connections to macro network 30. For example, MME 32 may be configured with one or more logical connections to one or more macro cells (e.g., Node Bs, eNode Bs, etc. (not shown)), which may be deployed in macro network 30 in order to provide cellular/mobile coverage for macro network 30. In various instances, macro network 30 may include access networks such as GSM EDGE radio access network (GERAN), UMTS terrestrial radio access network (UTRAN), generally referred to as 3G, and/or LTE access networks such as evolved UTRAN (E-UTRAN), generally referred to as 4G or LTE. HeNB-GW 24 may also be configured to interface with AAA element 34.

As referred to herein in this Specification, an HeNB radio access point 22 (e.g., HeNB radio access point 22) may also be referred to interchangeably as an "HeNB" or an "HeNB access point." As shown in FIG. 1, HeNB 22, HeNB-GW 24, MME 32 and AAA element 34 may each include a respective processor 14a-14d and a respective memory element 16a-16d. HeNB 22 may further be configured to interface with HeNB-GW 24 via internet 40. HeNB 22 and HeNB-GW 24 may each further include a respective access control module 18a-18b.

Although only one HeNB (e.g., HeNB 22) is shown in FIG. 1, it should be understood that multiple HeNBs may be deployed in communication system 10 in order to deliver contiguous service between macro network 30 and a small cell network. The small cell network may be made up of multiple HeNBs, including HeNB 22, in order to provide 4G/LTE cellular/mobile coverage for the small cell network. In various embodiments, the small cell network may further include one or more Home Node B (HNB) radio access points (not shown) in order to provide 3G cellular/mobile coverage for the small cell network.

Service provider network 50 may include other elements, gateways, etc. that may make up an Evolved Packet Core (EPC) for the network. For example, these elements may include, but not be limited to, a Home Subscriber Server (HSS), one or more serving gateways (SGWs), one or more packet data network gateways (PGWs), one or more serving gateway support nodes (SGSNs) and/or a policy and charging rules function (PCRF). These elements may be provided in service provider network 50 to provide various UE services and/or functions, to implement QoS on packet flows and to provide connectivity for UEs to external data packet networks. These elements are not shown in service provider network 50 in order to highlight other features of communication system 10.

Before detailing some of the operational aspects of FIG. 1, it is important to understand common characteristics of small cell access points (APs) (e.g., HeNBs, HNBs, or more generally, femtocells, picocells, etc.) as they generally operate in commercial architectures. The following foundation is offered earnestly for teaching purposes only and, therefore should not be construed in any way to limit the broad teachings of the present disclosure. In many network architectures, small cell APs can be deployed as autonomous units to improve reception in areas with poor coverage, or within buildings where coverage is reduced by the structure itself.

Essentially, small cell APs are fully featured base stations that can provide proximate coverage in a business (e.g., enterprise) and/or residential environment. Typically, small cell APs operate at lower radio power levels as compared to macro cell radio access networks (RANs). Small cell APs can be connected using a standard broadband digital subscriber line (DSL), internet or cable service into a service provider's network. Calls can be made and received, where the signals are sent (potentially encrypted) from the small cell AP via the broadband IP network to one of the service provider's main switching centers. Small cell APs can be provisioned to readily handle 8, 16, 32, etc. concurrent calls. Thus, a small cell AP (e.g., HeNB, HNB, etc.) generally operates as a mini tower for a proximate user. As used herein in this Specification, the terms "user" and "subscriber" may be used interchangeably.

Small cell APs can be provisioned to accommodate different access modes; e.g., modes through which resources (e.g., coverage, services, etc.) can be provided and/or limited to subscribers within range of a small cell AP. In Open Access Mode deployments, resources provided by a small cell AP is generally open to anyone within range; unless configurations operate to limit access to a given network to only those subscribers duly authorized for access to a given service provider network. In Closed Access Mode deployments, resources provided by a small cell AP are limited to subscribers within range and that are included in a closed subscriber group (CSG) for the small cell AP.

In Hybrid Access Mode deployments, a small cell AP may be configured to provide both Open and Closed resources for subscribers within range. For the Open portion provisioned on a Hybrid Access Mode small cell AP, resources can be provided to any subscribers within range; unless configurations operate to limit access to a given network to only those individuals duly authorized for access. For the Closed portion provisions for the Hybrid Access Mode small cell AP, resources may be limited to subscribers within range and that are included in a CSG for the small cell AP. Resources provided by a Hybrid Access Mode small cell AP may be differentiated between the Open and Closed portions. For example, subscribers attached through the Closed portion of a Hybrid access mode small cell AP may be provided increased Quality of Service (QoS), bandwidth, and/or other preferential services as compared to subscribers attached through the Open portion of the small cell AP. Other preferential services can include, for example, excluding attachment of subscribers to the Open portion if the number of subscribers desiring access through the Closed portion increases beyond a certain threshold. These examples are just a few of the many resources that can be differentiated between Closed and Open portions of a Hybrid Access Mode small cell AP for members/nonmembers of the CSG. Virtually any other resources provided by a Hybrid access mode small cell AP can be differentiated, and, thus, are clearly within the scope of the present disclosure.

Separately, it should be noted that small cell networks can leverage International Mobile Subscriber Identity (IMSI) data, which can uniquely identify a user (e.g., the SIM card) associated with a given UE. This means that an architecture can translate any entered phone number into an IMSI, which can be used by a small cell AP to grant/deny access to a service provider's network. An HSS can maintain a database that maps these number systems together. Additionally, service providers can provision one or more whitelists at various locations in the network. Subscribers (e.g., UEs) can be granted/denied access to the network via small cell access APs using the whitelist data provisioned in the network.

Note that there exist various obstacles for Closed/Hybrid access mode deployments for LTE HeNB small cell networks. The 3GPP provides one possible solution for LTE CSG capabilities, as described in technical specification 36.413 (TS 36.413), release 8, but this solution impacts a lot of EPC nodes as well as impacting signaling between the MME and HeNBs over the S1AP interface. For example, the solution for providing LTE CSG/Hybrid cell capabilities typically requires enhanced support by the MME and the HSS in the EPC, as well as a complete CSG infrastructure including a CSG List Server and a CSG Admin Server within an operator's network.

Some operators, however, want to deploy LTE small sells in Closed/Hybrid access modes without impacting the MME interfaces to EPC or without having to deploy a complete CSG infrastructure. Additionally, some operators that have deployed 3G HNBs based on an HNB gateway (HNB-GW) using AAA whitelist determination to determine CSG membership desire to re-use this investment for supporting LTE HeNB small cell networks. This is particularly relevant for dual/triple-stack APs that offer 3G, 4G/LTE and/or WiFi radio access capabilities in a single unit.

In general terms, for HNB small cell networks, if a given UE were to seek to initiate a session flow with a given Closed/Hybrid access mode HNB, the HNB can coordinate with an HNB-GW in order to determine (e.g., using whitelist data) whether a particular UE (e.g., a particular IMSI) was permitted to access the HNB services.

Note that there are two different registrations that typically occur in a 3G small cell network. The first registration is associated with the HNB registering with its associated HNB-GW following provisioning of the HNB via an HNB Management System (HMS). Through the HMS, the HNB may be provisioned according to technical report 069 (TR-069) protocol using the TR-196 data model. The second registration is associated with a UE that seeks to camp on an HNB. This second registration involves the HNB querying the HNB-GW before allowing the UE to register for service. For the second registration, non-access stratum (NAS) messages can be used in order for the HNB to communicate with the UE. For a given UE that seeks to access services of a given HNB, the HNB can communicate with the UE using one or more NAS messages to determine the IMSI of the UE.

The HNB may then coordinate with the HNB-GW to determine (e.g., using whitelist data) whether the UE is permitted to access services at the HNB. For example, the HNB-GW would evaluate its whitelist (which may have been suitably cached in the HNB-GW) and determine whether this particular UE (e.g., this particular IMSI) is authorized to access the HNB services.

It should be noted that NAS messages transmitted by a given UE include a send sequence number (N(SD)), which is incremented for every NAS message transmitted by the UE on a modulo-4 basis, as described in TS 24.007. As used herein in the present disclosure a "send sequence number" may be referred to generally as a "sequence number" and sequence numbers for NAS message may be identified using an N(SD)=0, 1, etc. identifier. During normal communications with a service provider network, sequence numbers for NAS messages received within the EPC (e.g. an SGSN within the EPC) are analyzed to ensure that no out of sequence NAS messages are received from the UE.

For 3G small cell networks, intercepting NAS messages by an HNB and communicating with a given UE to determine the UE IMSI causes the NAS sequence number to increment, and upon determining an IMSI of a subscriber associated with the UE, the sequence number for the NAS messages needs to be reset to avoid out of order messages being received by the core network (CN). One technique to reset the sequence number for 3G small cell networks is to communicate a mobility management null (MM-null) message from the HNB to the UE to reset the NAS sequence number for the UE.

In contrast, for 4G/LTE networks, LTE MME specifications limit the ability of any HeNB to autonomously process NAS messages by definition of various NAS protection systems, as described in TS 33.401. Therefore, legacy 3G approaches cannot be directly re-used to enable IMSI visibility at an HeNB. However, to achieve enterprise small cell integration of 4G/LTE the permanent identity (e.g., IMSI) of a user should be exposed to an HeNB/HeNB-GW. As noted, while this is supported in 3G via HNB application part (HNBAP) signaling between the HNB and HNB-GW, it is not supported in LTE over S1AP, thereby restricting the ability to integrate HeNBs into enterprise services environments.

In accordance with one embodiment, communication system 10 can overcome the aforementioned shortcomings (and others) by providing HeNB 22 with the capability to communicate evolved mobility management (EMM) identity requests/responses with UE 12 in order to recover the IMSI of the subscriber associated with UE 12 at HeNB 22, which may therefore enable enterprise services integration for 4G/LTE Closed/Hybrid Access mode control capabilities. Following recovery of the IMSI, HeNB 22 can further include functionality to advance the NAS sequence number for UE 12 by three ('3') values according to modulo-4 N(SD) incrementing for UE 12 to avoid out of sequence NAS messages being received by MME 32, if, for example, UE 12 is determined to be a member of a CSG provisioned for HeNB 22. By recovering the IMSI of the subscriber at HeNB 22, LTE CSG/Hybrid cell access control capabilities can be supported without impact to the EPC. Further, LTE CSG/Hybrid cell access control can be converged with 3G HNB access control techniques, thus allowing HeNB-GW 24 to interface with a whitelist database via AAA element 34.

During operation, for example, when a given UE 12 is within range of HeNB 22 and is attempting to initiate a session, UE 12 may communicate a NAS EMM-attach request having an N(SD)=0 to HeNB 22. HeNB 22 may determine if UE 12 may be transitioning to HeNB 22 from a macro cell of macro network 30 or if UE 12 may be transitioning to HeNB 22 from another HeNB in the small cell network. HeNB 22, via access control module 18a, may include functionality to analyze a last visited tracking area identity (TAI) for UE 12 to determine if the UE is moving into the HeNB small cell layer for HeNB 22 from a macro cell in macro network 30 or is merely moving between HeNBs in the small cell layer. HeNB 22 may, for example, determine the last visited TAI for UE 12 through a tracking area update (TAU) initiated by UE 12. In one or more embodiments, TAUs can be initiated based on a UE transitioning between tracking areas, timers within a UE or other similar mechanisms.

To illustrate features of communication system 10, assume for the present example that HeNB 22 may be provisioned in either a Closed or Hybrid access mode to provide resources for a CSG. Further assume that HeNB 22 may be provisioned with a CSG identifier (CSG-ID) for the CSG and access mode ID (e.g., Closed, Hybrid) via TR-069 provisioning using an HNB/HeNB management system (not shown), which can be provided in communication system 10.

In one instance, HeNB 22 may determine that UE 12 may be moving into the HeNB small cell layer (e.g., the last visited TAI for UE 12 does not match a TAI provisioned for HeNB 22 or the last visited TAI corresponds to a TAI for macro network 30). Based on this determination, HeNB 22 can communicate a NAS EMM-identity request message to UE 12 to recover the IMSI for UE 12 (e.g., for the subscriber associated with UE 12). UE 12 may respond to the request with its corresponding IMSI using a NAS EMM-identity response message having an N(SD)=1. After recovering the IMSI, HeNB 22 may need to advance or increment the N(SD) for UE 12 by three back to N(SD)=0 to avoid any out of sequence messages being received by MME 32 if UE 12 may be granted access to HeNB 22. HeNB 22 may include capabilities to reset the NAS message sequence number for UE 12 to a number corresponding to the sequence number received for the initial request to attach to HeNB 22 (e.g., N(SD)=0, for the present example). HeNB 22 can advance the sequence number by communicating a series of dummy NAS messages to UE 12. In one or more embodiments, the dummy NAS messages could be NAS EMM-identity request messages, which will cause UE 12 to respond with an identity response messages, each including an incremented sequence number, or any other NAS messages types that may elicit a response from UE 12.

HeNB 22 may query HeNB-GW 24 to determine if the subscriber associated with UE 12 should be granted resources provided by HeNB 22. To perform the query, HeNB 22 may append an S1AP initial UE message communicated to HeNB-GW 24 with an S1AP proprietary extension for a membership query that may include the recovered IMSI for the subscriber associated with UE 12, the CSG-ID of the CSG provisioned for HeNB 22 and the cell access mode for HeNB 22 for the corresponding CSG. HeNB-GW 24, via access control module 18b, may include a capability to analyze the S1AP extension in order to perform access control for HeNB 22. In one embodiment, using an appropriate AAA interface, HeNB-GW 24 may communicate an access request message to AAA element 34 including the IMSI and the CSG-ID for HeNB 22. AAA element 34 may respond with an access response message including the membership status of UE 12 for the CSG provisioned for HeNB 22. Based on the response, HeNB-GW 24 can to determine whether the subscriber associated with UE 12 is a member of the CSG provisioned for HeNB 22. In one or more embodiments, communication system 10 may include other AAA servers or AAA services, which HeNB-GW 24 may query to determine the membership status of various UEs. In another embodiment, HeNB-GW 24 may recover a list of authorized IMSI's for HeNB 22 during setup of HeNB 22 via S1AP Setup messages communicated between HeNB 22 and MME 32 (e.g., via HeNB-GW 24).

HeNB-GW 24 may include a capability to deliver a membership response to HeNB 22 using an S1AP proprietary extension, which can indicate whether or not UE 12 is a member of the CSG provisioned for HeNB 22. The S1AP proprietary extension for the membership response may include the IMSI of the subscriber associated with UE 12, the CSG-ID of the CSG provisioned for HeNB 22, the cell access mode provisioned for HeNB 22 for the corresponding CSG and the membership status of the subscriber associated with UE 12 in the CSG.

If, in one example, HeNB-GW 24 determines that the subscriber associated with UE 12 is not a member of the CSG provisioned for HeNB 22 and, additionally, if HeNB 22 is provisioned in a Closed access mode, then HeNB-GW 24 can autonomously indicate that the subscriber associated with UE 12 is not a member of the CSG using an error indication message, included as an S1AP proprietary extension for the membership response, which may indicate that the subscriber associated with UE 12 is not a member of the CSG for Closed access mode HeNB 22. In an embodiment, the error indication message may be included as an S1AP proprietary extension for a downlink (DL) NAS transport message. HeNB 22 may include functionality to autonomously generate a NAS EMM-attach reject message for the nonmember subscriber associated with UE 12 in such Closed CSG environments upon receiving the membership response from HeNB-GW 24 indicating that the subscriber associated with UE 12 is not a member of the CSG.

If, in another example, UE 12 is a member of the CSG provisioned for HeNB 22, S1AP signaling between UE 12, HeNB 22, HeNB-GW 24 and MME 32 may continue for EMM-attach request and EMM-authorization response messaging. Recall, that HeNB 22 may include capabilities to advance the NAS message sequence number for UE 12 to a number corresponding to the sequence number received for the initial EMM-attach request message communicated to HeNB 22 (e.g., N(SD)=0, for the present example). Thus, UE 12 may respond to an EMM-authorization request message communicated from HeNB 22 with a NAS EMM-authorization response message having N(SD)=1. The authorization response message may be communicated back to MME 32 through S1AP signaling, and, since the sequence number of N(SD)=1 for the EMM-authorization response may be received in a sequential order, MME 32 may accept the message and location update procedures may continue normally for UE 12, as described in TS 23.401.

Following the location update procedures, MME 32 may issue an S1AP initial context setup request message to UE 12. HeNB-GW 24 may receive the message and may include functionality to associate the IMSI for the subscriber associated with UE 12 with a Globally Unique Mobility Management Entity Identity (GUMMEI) and a Mobility Management Entity UE S1AP Identity (MME UE S1AP ID) for the subscriber if the subscriber is a member of the CSG provisioned for HeNB 22. The GUMMEI may identify MME 32 in service provider network 50 and the MME UE S1AP ID may be provisioned by MME 32 to identify UE 12 over the S1 interface within MME 32. The GUMMEI and MME UE S1AP ID may be included in the S1AP message received from MME 32. HeNB-GW 24 may store the association together with the IMSI, the CSG-ID for HeNB 22 and the member status of the subscriber associated with UE 12 for the CSG provisioned for HeNB 22. This stored association may be used to facilitate subscriber identification for UE transitions between HeNBs for the small cell network layer, as described in further detail below. HeNB-GW 24 may deliver a membership response to HeNB 22 using an S1AP proprietary extension to an S1AP initial context setup request message indicating that UE 12 is a member of the CSG provisioned for HeNB 22. As noted above, the membership response may include the IMSI and membership status for UE 12 (e.g., UE 12 is a member of the CSG for this example) as well as the CSG-ID and cell access mode for HeNB 22.

Upon receiving a membership response indicating that UE 12 is a member of the CSG provisioned for HeNB 22, HeNB 22 may provide resources to UE 12. The resources may vary based on the access mode provisioned for HeNB 22. For example, if HeNB 22 is provisioned in a Closed access mode and the subscriber associated with UE 12 is a member of the CSG, then HeNB 22 may provide resources to UE 12 as determined by the CSG provisioning for the Closed access mode. In another example, if HeNB 22 is provisioned in a Hybrid access mode and the subscriber associated with UE 12 is a member of the CSG, then HeNB 22 may provide enhanced resources (if so provisioned for the CSG) to UE 12. However, if HeNB 22 is provisioned in a Hybrid access mode and the subscriber associated with UE 12 is not a member of the CSG, then HeNB 22 may merely provide normal or non-enhanced resources to the nonmember UE 12. These examples are just a few of the many means and methods that may be used to differentiate resources between Closed and Open portions of a Hybrid Access Mode HeNB. Virtually any other resources may be differentiated for a Hybrid Access Mode HeNB, and, thus, are clearly within the scope of the present disclosure.

Recall, as noted above that, upon receiving a request from UE 12 to initiate a session, HeNB 22 may first determine (e.g., by analyzing a last visited TAI for UE 12) if UE 12 is transitioning to HeNB 22 from a macro cell of macro network 30 or if UE 12 is transitioning to HeNB 22 from another HeNB in the small cell network. Thus, in another instance, HeNB 22 may determine that UE 12 may be transitioning to HeNB 22 from another HeNB (e.g., the last visited TAI matches or is equal to a TAI provisioned for HeNB 22 or, if the last visited TAI is not available, then it can be assumed that UE 12 is already known within the small cell network). Assume also for this instance that HeNB 22 may be provisioned in either a Closed or Hybrid Access Mode to provide resources for a CSG provisioned for HeNB 22. Further assume that HeNB 22 may be provisioned with a CSG identifier (CSG-ID) for the CSG and access mode ID (e.g., Closed, Hybrid) via TR-069 provisioning through an HNB/HeNB management system (not shown).

In this instance, HeNB 22 may communicate an S1AP initial UE message to HeNB-GW 24 with the S1AP proprietary extension for the membership query that may include the CSG-ID for the CSG provisioned for HeNB 22 and the cell access mode provisioned for HeNB 22. For the S1AP message, a NAS packet data unit (PDU) field in the S1AP message may be embedded with the EMM-attach request received from UE 12 having an N(SD)=0. Note that the IMSI of UE 12 may be unknown to HeNBs for transitions between HeNBs in the small cell network, but may be known to MME 32, as MME 32 previously authenticated UE 12 upon its transition into the small cell network from macro network 30. However, the EMM-attach request may include an old Globally Unique Temporary Identity (GUTI) comprised of a GUMMEI identifying an MME that had previously allocated the GUTI, which may or may not have been MME 32 (e.g., if UE 12 moves from another macro network or another MME within macro network 30) and an MME Temporary Mobile Subscriber Identity (M-TMSI), which also identifies UE 12 within the MME that allocated the GUTI. Using the GUTI, MME 32 can determine the IMSI of UE 12 and, assuming that UE 12 is authorized to access service provider network 50, location update operations for UE 12 may continue normally, as described for the previous instance.

Following the location update operations, MME 32 may communicate an S1AP initial context setup request message to HeNB-GW 24, which may include the GUTI for UE 12. HeNB-GW 24, in turn, may query the stored GUMMEI+ MME UE S1AP ID association of UE 12 to recover the IMSI for UE 12 and, additionally, to determine the membership status of the subscriber associated with UE 12 in the CSG provisioned for HeNB 22 from the recovered association. As described above, resources may or may not be provided to UE 12 based on whether UE 12 is a member of the CSG provisioned for HeNB 22 and the access mode (e.g., Closed, Hybrid) provisioned for HeNB 22. Signaling with UE 12 may proceed, as described above, based on the determination.

In one example implementation, the CSG-ID included in the membership query received from HeNB 22 may not match the CSG-ID for the association for UE 12 as stored in HeNB-GW 24, which may indicate that the previous HeNB from which UE 12 transitioned may have been provisioned with a different CSG than the one provisioned for HeNB 22. In one or more embodiments, nonmatching CSG-IDs may trigger HeNB-GW 24 to interface with AAA element 34 (or any other AAA service that may be provided in communication system 10) to determine if UE 12 is a member of the CSG provisioned for HeNB 22. Signaling operations with UE 12, as well as storing of a new GUMMEI+ MME UE S1AP ID association, may occur as described previously.

The solution provided by communication system 10 may provide several advantages over the solution prescribed in TS 36.413, release 9. For example, the solution provided by communication system 10 does not require EPC changes to provide a full CSG implementation, particularly, changes to MME interfaces to the EPC. Further, the solution provided by communication system 10 provides a converged architecture with 3G HNB-GW based access control mechanisms which are currently implemented or deployed by various equipment manufacturers and network service providers. Additionally, the solution provided by communication system 10 enables LTE enterprise controller evolution for equipment manufacturers and network service providers.

In various embodiments, the capability of obtaining a subscriber's IMSI at HeNB-GW 24 may provide other uses for communication system 10. In some embodiments, obtaining a subscriber's IMSI at HeNB-GW 24 could be used via one or more 'presence' application programming interfaces (APIs) to notify a third-party system about the presence of a given UE. Such presence information may allow functional parity between HeNB-GW 24 and a 3G HNB-GW. In other embodiments, obtaining a subscriber's IMSI at HeNB-GW 24 may provide for various UE paging optimizations, which may allow HeNB-GW 24 to identify a target small cell access point, a grid of small cell access points and/or groups of small cell access points sharing an Over-The-Air (OTA) Tracking Area Code (TAC) for paging certain UEs. In yet other embodiments, obtaining a subscriber's IMSI at HeNB-GW may provide for various macro to small cell hand-in operations. For example, in a Closed access mode deployment, this may enable matching an IMSI to whitelists for certain hand-in operations, as discussed herein in this Specification. For an Open access mode deployment, this may aid in determining a small cell access point to receive a given UE based on UE WiFi presence.

In various embodiments, UE 12 can be associated with users, employees, clients, customers, etc. wishing to initiate a flow in communication system 10 via some network. The terms "user equipment," "mobile node," "end user," "user," and "subscriber" are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 10. UE 12 may also be inclusive of a suitable interface to a human user such as a microphone, a display, a keyboard, or other terminal equipment.

UE 12 may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12 may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

HeNB 22 can offer suitable connectivity to one or more UE 12 using any appropriate protocol or technique. In general terms, HeNB 22 represents a radio access point device that can allow UEs to connect to a wired network using Wi-Fi, Bluetooth™, WiMAX, 4G/LTE, or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), an HeNB, an HNB, or any other suitable access device, which may be capable of providing suitable connectivity to a UE. In certain cases, the access point can connect to a router (via a wired network), which can relay data between the UE and other UE of the network.

The EPC components of service provider network 50 may be referred to generally as control nodes, control gateways or simply gateways. The gateways may be used to provide various UE services and/or functions and to implement QoS on packet flows. The services and functions may be used, for example, to provision voice over IP (VoIP) routing, enhanced services such as enhanced charging, stateful firewalls and/or traffic performance optimization (TPO). MME 32 is the primary control element for the EPC. Among other things, MME 32 may provide for UE tracking and paging procedures including, for example, retransmissions, tracking area list management, idle mode UE tracking, etc.

AAA element 34 is a network element responsible for accounting, authorization and authentication functions for UE 12. For AAA considerations, AAA element 34 may provide a mobile node IP address and the accounting session identification (Acct-Session-ID) and other mobile node states in appropriate messaging (e.g., via access-Request/access-Response messages). Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service. Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In addition, it may record events such as authentication and authorization failures, and include auditing functionality, which permits verifying the correctness of procedures carried out based on accounting data. In various embodiments, communication system 10 may be provisioned with other AAA services and/or AAA servers, which may provide AAA considerations for the system.

As shown in FIG. 1, HeNB 22, HeNB-GW 24, MME 32 and AAA element 34 each include respective processors 14a-14d and respective memory elements 16a-16d. Additionally, HeNB 22 and HeNB-GW each further include respective access control modules 18a-18b. Hence, appropriate software and/or hardware is being provisioned in HeNB 22, HeNB-GW 24, MME 32 and AAA element 34 in order to facilitate identifying a subscriber in the network environment. Note that in certain examples, certain databases (e.g., for storing GUMMEI+ MME UE S1AP ID associations with various IMSIs) can be consolidated with memory elements (or vice versa), or the storage can overlap/exist in any other suitable manner.

In one example implementation, HeNB 22, HeNB-GW 24, MME 32 and AAA element 34 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate subscriber identification activities (e.g., for networks such as those illustrated in FIG. 1). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of HeNB 22, HeNB-GW 24, MME 32 and AAA element 34 can include memory elements for storing information to be used in achieving the subscriber identification operations, as outlined herein. Additionally, each of these devices may include a processor that can execute software or an algorithm to perform the subscriber identification activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to HeNB 22, HeNB-GW 24, MME 32 and AAA element 34 could be provided in any database, register, control list, cache, or storage structure: all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and user equipment (e.g., mobile nodes) can also include suitable interfaces for receiving, transmitting, and/or otherwise communicating data or information in a network environment.

Note that in certain example implementations, the subscriber identification functions as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 2:
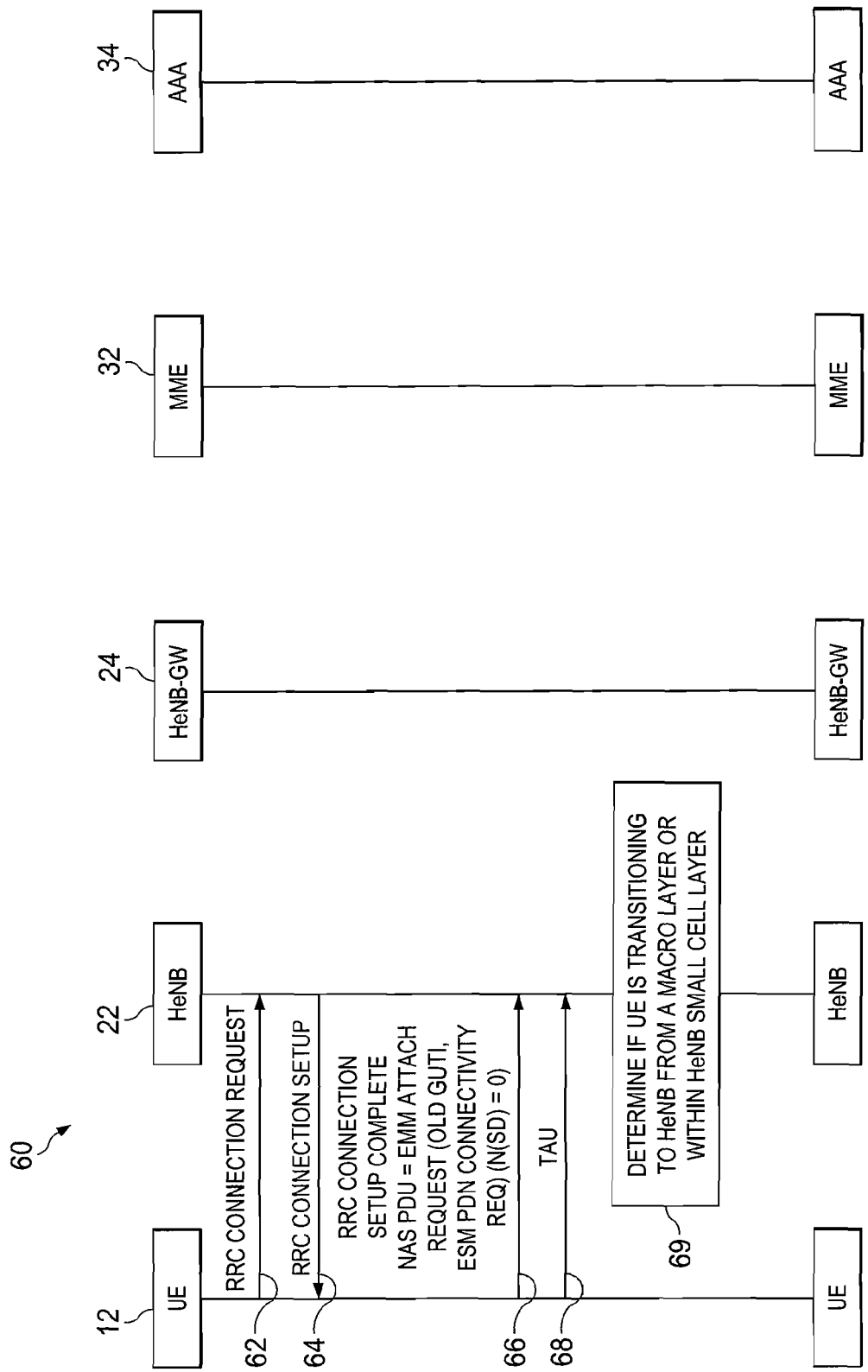
FIG. 2 is a simplified flow diagram illustrating example flows and activities associated with identifying a subscriber in a network environment in accordance with one potential embodiment of the present disclosure.

Referring to FIG. 2, FIG. 2 is a simplified flow diagram 60 that illustrates example flows and activities associated with identifying a subscriber in a network environment according to an embodiment. In FIGS. 2, 3, 4A-4B, 5 and 6A-6B the flows of data and activities represented show the flow of data between the components and activities performed by certain components within communication system 10 as shown in FIG. 1 including UE 12, HeNB 22, HeNB-GW 24, MME 32 and AAA element 34. For the operations within the architecture of FIGS. 2, 3, 4A-4B, 5 and 6A-6B it is assumed, unless otherwise noted, that HeNB 22 has been provisioned in either a Closed or Hybrid access mode for a particular CSG having a particular CSG-ID and access mode ID for the corresponding CSG, which may be provisioned for HeNB 22 according to the TR-069 protocol using the TS-169 data model by an HNB/HeNB management system.

A particular flow may begin at 62 with UE 12 communicating a radio resource control (RRC) connection request message to HeNB 22 in order to initiate a session with HeNB 22. As noted above, HeNB 22 may be connected to other HeNBs in a small cell network or layer. At 64, HeNB 22 responds to UE 12 with an RRC connection setup message. At 66, an RRC connection setup complete message is communicated from UE 12 to HeNB 22. The RRC connection setup complete message includes a NAS PDU field embedded with an EMM-attach request having an N(SD)=0. The EMM-attach request includes an old GUTI comprised of a GUMMEI identifying an MME that had previously allocated the GUTI, which may or may not have been MME 32 (e.g., if UE 12 moves from another macro network or another MME within macro network 30) and an M-TMSI, which identifies UE 12 within the MME that allocated the GUTI. At 68, HeNB 22 may receive a TAU from UE 12. It should be noted that the order of receiving the TAU from UE 12 is not dependent on the sequence of flows illustrated in FIG. 2. A TAU can be received at any time from UE 12 as UE 12 seeks to initiate a session with HeNB 22.

At 69, upon receiving the RRC connection setup complete message from UE 12, HeNB 22 may determine, by performing a TAI comparison using the last visited TAI for UE 12, if UE 12 is transitioning to HeNB 22 from a macro cell layer (e.g., macro network 30) or is transitioning to HeNB 22 from another HeNB in the small cell layer. HeNB 22 may compare the last visited TAI received from UE 12 to TAIs for macro network 30 and/or to TAIs for the small cell network to which HeNB 22 belongs to make the determination. The TAIs for macro network 30 the small cell network may be cached by HeNB 22. Several possible alternative flows and activities may be performed based on the determination made by HeNB 22 regarding whether UE 12 is transitioning to HeNB 22 from macro network 30 or from another HeNB in the small cell network including HeNB 22. These various possible alternative flows and activities are discussed in further detail below.

Referring now to FIG. 3, FIG. 3 is a simplified flow diagram 70 that illustrates example flows and activities associated with a possible alternative to the determination made by HeNB 22 as shown in FIG. 2 regarding whether UE 12 is transitioning to HeNB 22 from macro network 30 or from another HeNB in the small cell network including HeNB 22. The possible alternative shown in the simplified flow diagram 70 of FIG. 3 illustrates example flows and activities corresponding to a determination by HeNB 22 that UE 12 has transitioned to HeNB 22 from macro network 30 (e.g., the last visited TAI received from UE 12 does not match or is not equal to a TAI provisioned for HeNB 22 or the last visited TAI received from UE 12 matches a TAI for macro network 30). Based on the determination, HeNB 22 can recover the subscriber's IMSI from UE 12 through an EMM messaging exchange with UE 12. At 72a, HeNB 22 can communicate an RRC downlink (DL) information transfer message having a NAS PDU field embedded with a request for the IMSI of the subscriber associated with UE 12 (e.g., EMM-identity request (IMSI)). At 72b, UE 12 can respond with an RRC uplink (UL) information transfer having a NAS PDU field embedded with a response to the request including the IMSI and having a sequence number N(SD)=1 (e.g., EMM-identity response (IMSI)). Recall, the N(SD) for the RRC connection setup complete message was N(SD)=0, as shown in FIG. 2.

At 74, HeNB 22 may communicate a membership query to HeNB-GW 24 to determine if the subscriber associated with UE 12 is a member of the CSG provisioned for HeNB 22. As shown at 74, HeNB 22 can communicate an S1AP initial UE message to HeNB-GW 24 including an S1AP proprietary extension for the membership query that may include the recovered IMSI for the subscriber associated with UE 12, the CSG-ID of the CSG provisioned for HeNB 22 and the cell access mode for HeNB 22 for the corresponding CSG. The S1AP message can include a NAS PDU field embedded with an EMM-attach request having an N(SD)=0. Setting the N(SD)=0 for the EMM-attach request can be used in instances where the UE is determined to be transitioning between HeNBs in a small cell layer in order to avoid out of sequence messages be received by the MME, but may not be needed for instances where it is determined that the UE is transitioning to an HeNB from a macro network.

Returning to FIG. 3, HeNB 22 can advance the N(SD) for UE 12 by three values at 76a-76c through an exchange of a series of dummy messages with UE 12. In one or more embodiments, HeNB 22 may communicate three additional EMM identity requests to UE 12, and, in turn, UE 12 may increment its N(SD) in each response to the requests according to its modulo-4 incrementing scheme (e.g., N(SD)=2, N(SD)=3, N(SD)=0).

HeNB-GW 24 can perform access control for HeNB 22 upon receiving the membership query from HeNB 22. At 78a, HeNB-GW 24 can query AAA element 34 with an access request message including the IMSI of the subscriber associated with UE 12 and the CSG-ID for the CSG provisioned for HeNB 22 to determine the membership status of the subscriber in the CSG. At 78b, AAA element can communicate the membership status of the subscriber to HeNB-GW 24 in an access response message. Thus, through flows 78a-78b, HeNB-GW 24 can determine whether the subscriber associated with UE 12 is a member or is a nonmember of the CSG provisioned for HeNB 22.

Figure 4A:
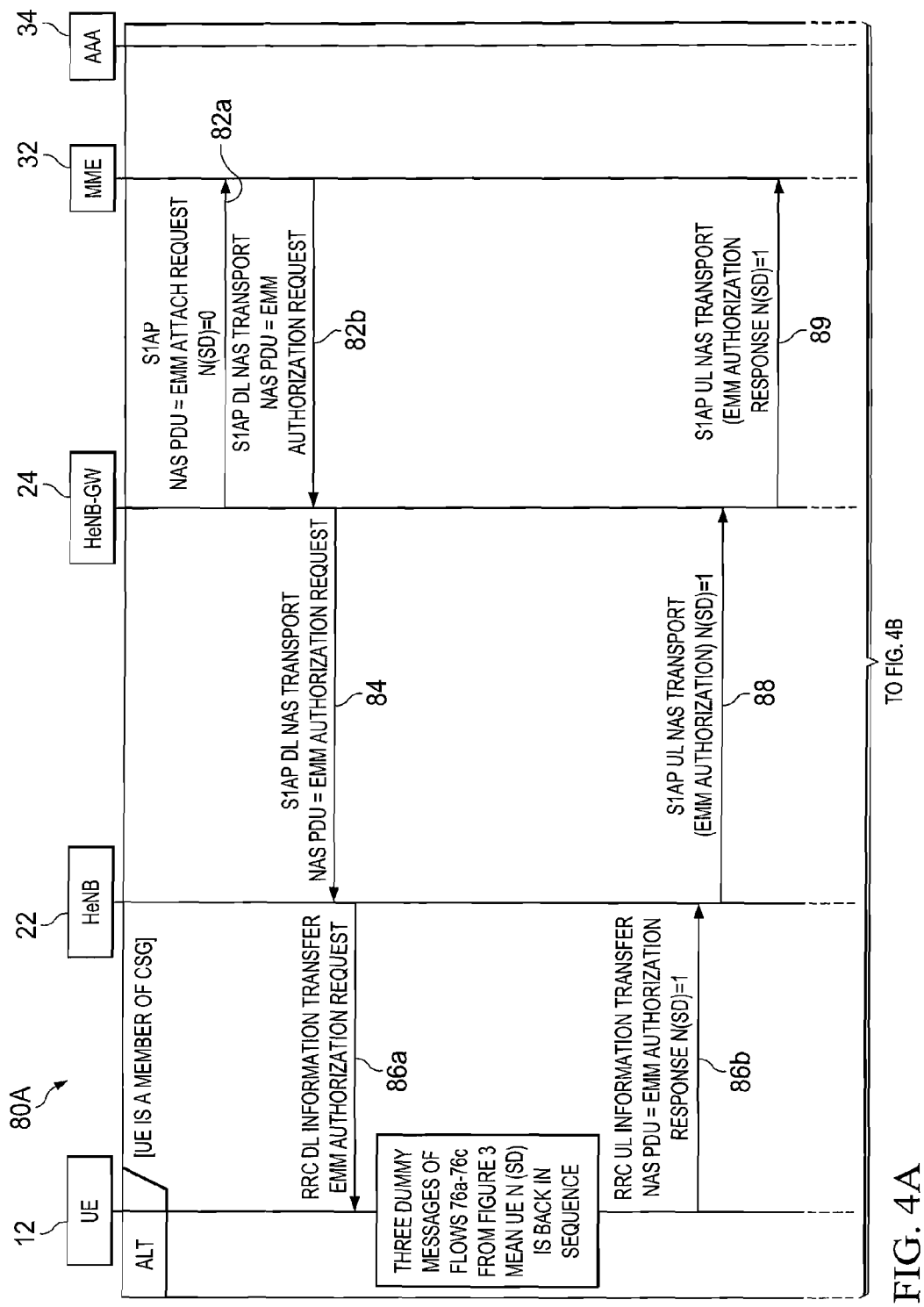
FIGS. 4A-4B are simplified flow diagrams illustrating yet other example flows and activities associated with identifying a subscriber in a network environment in accordance with one potential embodiment of the present disclosure.
Figure 4B:
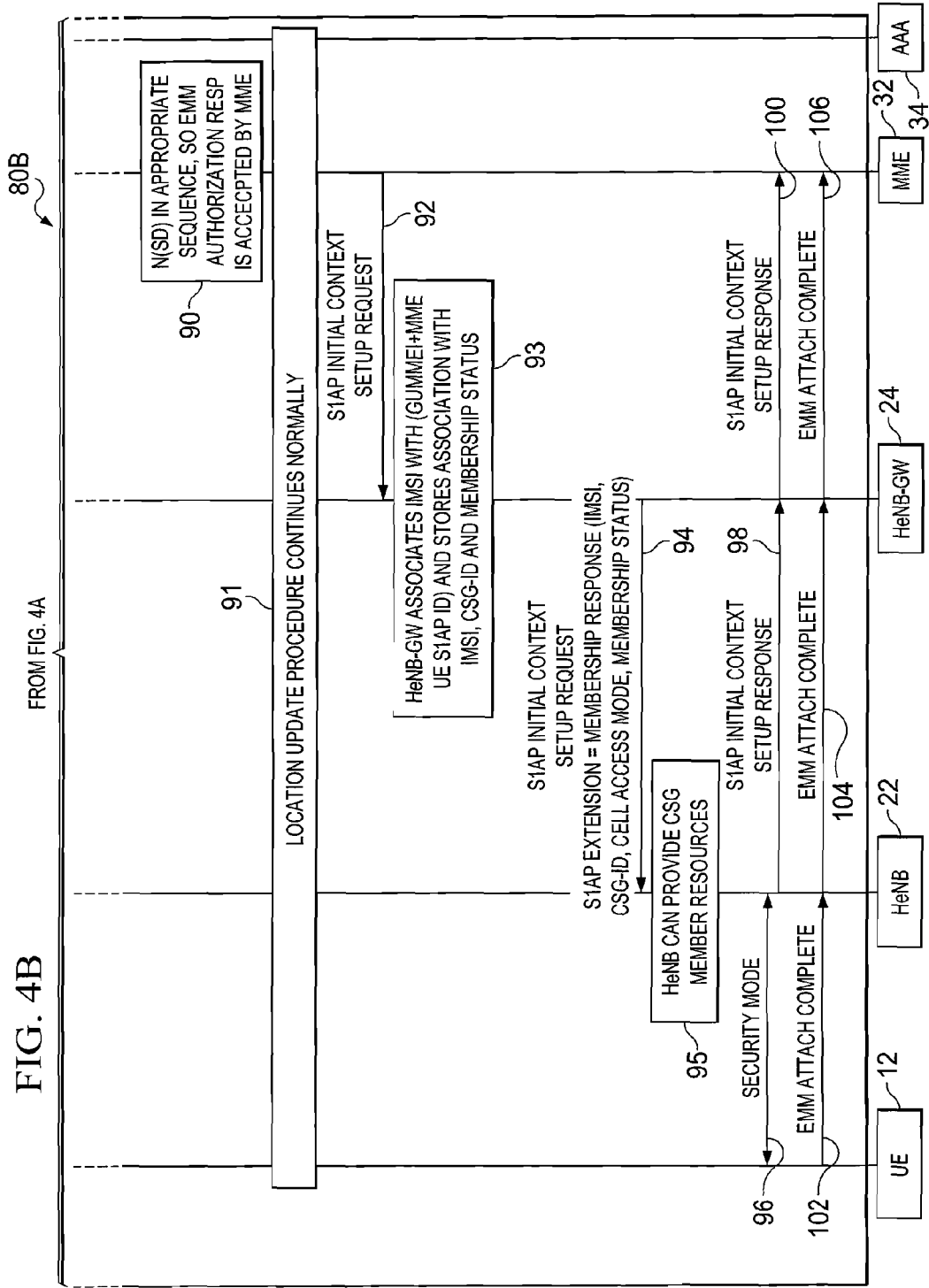

Referring now to FIGS. 4A-4B, FIGS. 4A-4B are simplified flow diagrams 80A-80B, respectively, that illustrates example flows and activities associated with a possible alternative to the membership determination shown in FIG. 3 regarding whether or not UE 12 is a member of the CSG provisioned for HeNB 22. The possible alternative shown in the simplified flow diagrams 80A-80B of FIGS. 4A-4B, respectively, illustrates example flows and activities corresponding to a determination by HeNB-GW 24 that the subscriber associated with UE 12 is a member of the CSG provisioned for HeNB 22. As shown in FIG. 4A, based on the determination that the subscriber associated with UE 12 is a member of the CSG provisioned for HeNB 22, HeNB-GW 24 may communicate an S1AP UL NAS transport message to MME 32 at 82a. The NAS PDU field of the S1AP message may be embedded with the EMM-attach request having an N(SD)=0 as received from HeNB 22 as shown in FIG. 3. At 82b, MME 32 can communicate EMM-authorization request embedded an S1AP DL NAS transport message. At 84, HeNB-GW 24 can communicate the EMM-authorization request to HeNB 22 in another S1AP DL NAS transport message. At 86a, HeNB 22 can communicate an RRC DL information transfer message including the EMM-authorization request to UE 12.

Recall, from flows 76a-76c of FIG. 3 that HeNB 22 may communicate three dummy messages to UE 12 to advance its N(SD) back to the sequence number corresponding to the sequence number for the initial EMM-attach request sent from UE 12 to HeNB 22. As shown in flow 66 of FIG. 2, this corresponds to an N(SD)=0. Thus, when UE 12 receives the EMM-authorization request from HeNB 22 at flow 86a, then UE 12 can respond with an EMM-authorization response having an appropriate N(SD)=1, as shown at 86b. The EMM-authorization response may be embedded in the NAS PDU field of an RRC UL information transfer message communicated from UE 12 to HeNB 22. At 88, HeNB 22 may communicate the EMM-authorization response to HeNB-GW 24 in an S1AP UL NAS transport message. At 89, HeNB-GW 24 can, in turn, communicate the EMM-authorization response to MME 32 in another S1AP UL NAS transport message.

The flows and activities 80A from FIG. 4A may continue to flows and activities 80B shown in FIG. 4B. Because the EMM-authorization response includes an N(SD)=1, which corresponds to an appropriate sequence number following the EMM-attach request of flow 82a, the EMM-authorization response is accepted by MME 32 at 90. Following acceptance of the EMM-authorization response, the location update procedure for UE 12 can continue in a normal manner at 91 between UE 12 and MME 32.

Following the location update, MME 32 can communicate an S1AP initial context setup request message to HeNB-GW 24, as shown at 92. The S1AP message may include the GUMMEI identifying MME 32 and the MME UE S1AP ID identifying UE 12 within MME 32. Upon receipt of the message, HeNB-GW, at 93, may associate a GUMMEI identifying MME 32 and an MME UE S1AP ID identifying UE 12 within MME 32 with the IMSI for the subscriber associated with UE 12 and may store the GUMMEI and MME UE S1AP ID association in relation to the IMSI, the CSG-ID for the CSG provisioned for HeNB 22 and the membership status of the subscriber in the CSG. As referred to herein, the GUMMEI and MME UE S1AP ID association may be referred to interchangeably as 'GUMMEI+ MME UE S1AP ID'.

At 94, HeNB-GW 24 can deliver a membership response to HeNB 22 using an S1AP proprietary extension to an S1AP initial context setup request message indicating that UE 12 is a member of the CSG provisioned for HeNB 22 indicating that UE 12 is a member of the CSG provisioned for HeNB 22. The S1AP proprietary extension for the membership response may include the IMSI of the subscriber associated with UE 12, the CSG-ID of the CSG provisioned for HeNB 22, the cell access mode provisioned for HeNB 22 for the corresponding CSG and the membership status of the subscriber associated with UE 12 in the CSG, here, that the subscriber is a member of the CSG.

Based on the determination that the subscriber associated with UE 12 is a member of the CSG provisioned for HeNB 22 can provide resources to UE 12 at 95. The resources provided may depend on the cell access mode provisioned for HeNB 22. For example, if HeNB 22 is provisioned in a Closed access mode and the subscriber associated with UE 12 is a member of the CSG, then HeNB 22 may provide resources to UE 12 as determined by the CSG provisioning for the Closed access mode. In another example, if HeNB 22 is provisioned in a Hybrid access mode and the subscriber associated with UE 12 is a member of the CSG, then HeNB 22 may provide enhance resources (if so provisioned for the CSG) to UE 12. However, if HeNB 22 is provisioned in a Hybrid access mode and the subscriber associated with UE 12 is not a member of the CSG, then HeNB 22 may merely provide normal resources to the nonmember UE 12.

At 96, security mode control procedures between UE 12 and HeNB 22 may continue as normal. Following the security mode procedures, HeNB 22 can communicate an S1AP initial context setup response message to HeNB-GW 24 at 98. The S1AP initial context setup response message can be communicated from HeNB-GW 24 to MME 32 at 100. At 102, UE 12 can communicate an EMM-attach complete to HeNB 22, which can communicate the message at 104 using S1AP signaling to HeNB-GW 24, which can further communicate the message at 106 using S1AP signaling to MME 32.

Figure 5:
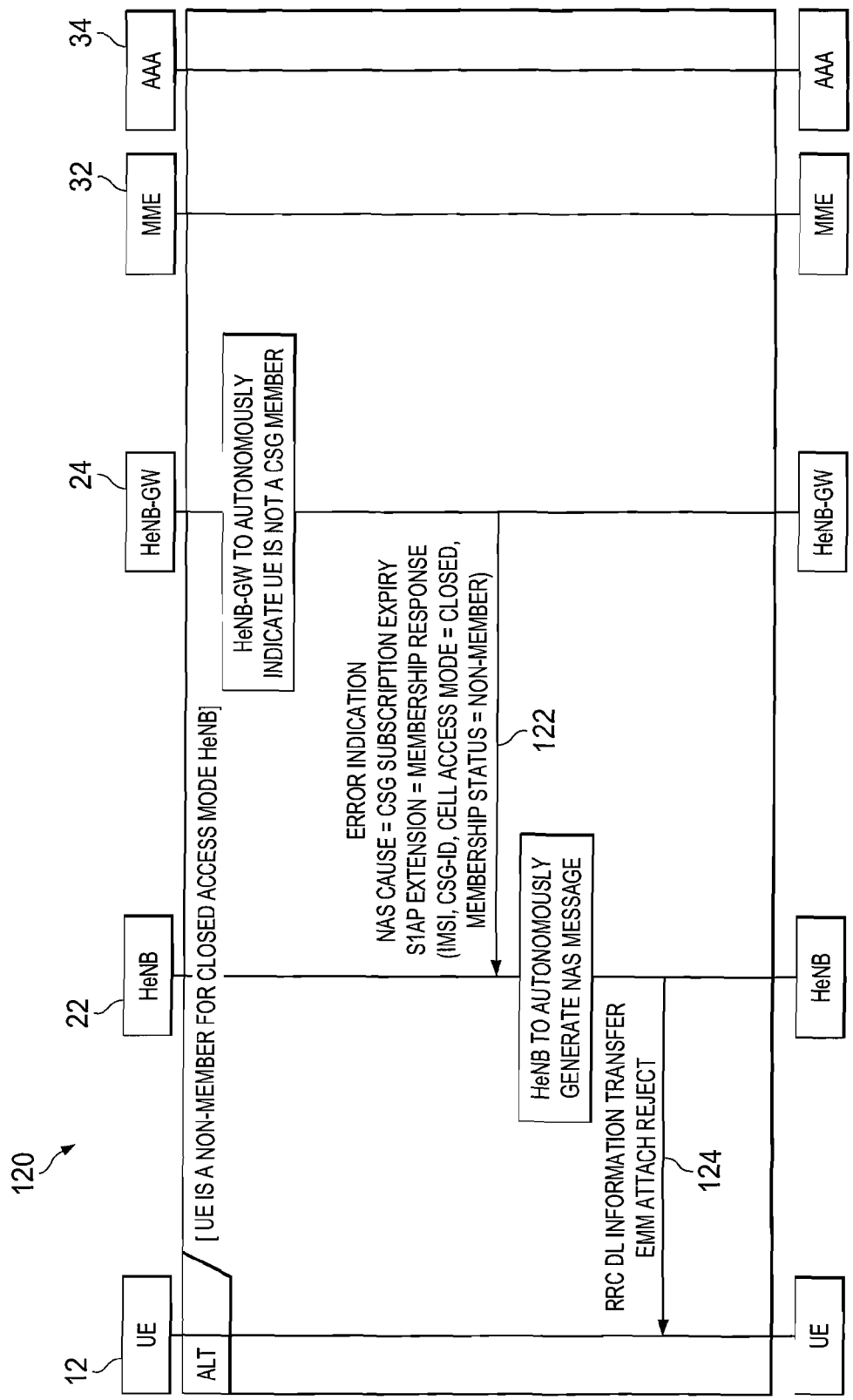
FIG. 5 is a simplified flow diagram illustrating yet other example flows and activities associated with identifying a subscriber in a network environment in accordance with one potential embodiment of the present disclosure.

Referring now to FIG. 5, FIG. 5 is a simplified flow diagram 120 that illustrates example flows and activities associated with another possible alternative to the membership determination shown in FIG. 3 regarding whether or not UE 12 is a member of the CSG provisioned for HeNB 22. The possible alternative shown in the simplified flow diagram 120 of FIG. 5 illustrates example flows and activities corresponding to a determination by HeNB-GW 24 that the subscriber associated with UE 12 is a nonmember of the CSG provisioned for HeNB 22 (e.g., from flows 78a-78b of FIG. 3) and assumes, for example, that HeNB 22 is provisioned in a Closed Access mode. Based on the determination that the subscriber associated with UE 12 is not a member of the CSG provisioned for Closed access mode HeNB 22 in the present example, HeNB-GW 24 can autonomously indicate to HeNB 22 that the subscriber associated with UE 12 is not a CSG member. At 122, HeNB-GW can communicate an error indication message included as an S1AP proprietary extension in a NAS transport message for the membership response, which may indicate that the subscriber associated with UE 12 is not a member of the CSG for Closed access mode HeNB 22. At 124, HeNB 22 can autonomously generate a NAS EMM-attach reject for the nonmember subscriber associated with UE 12, which may be embedded in an RRC DL information transfer message to UE 12.

Figure 6A:
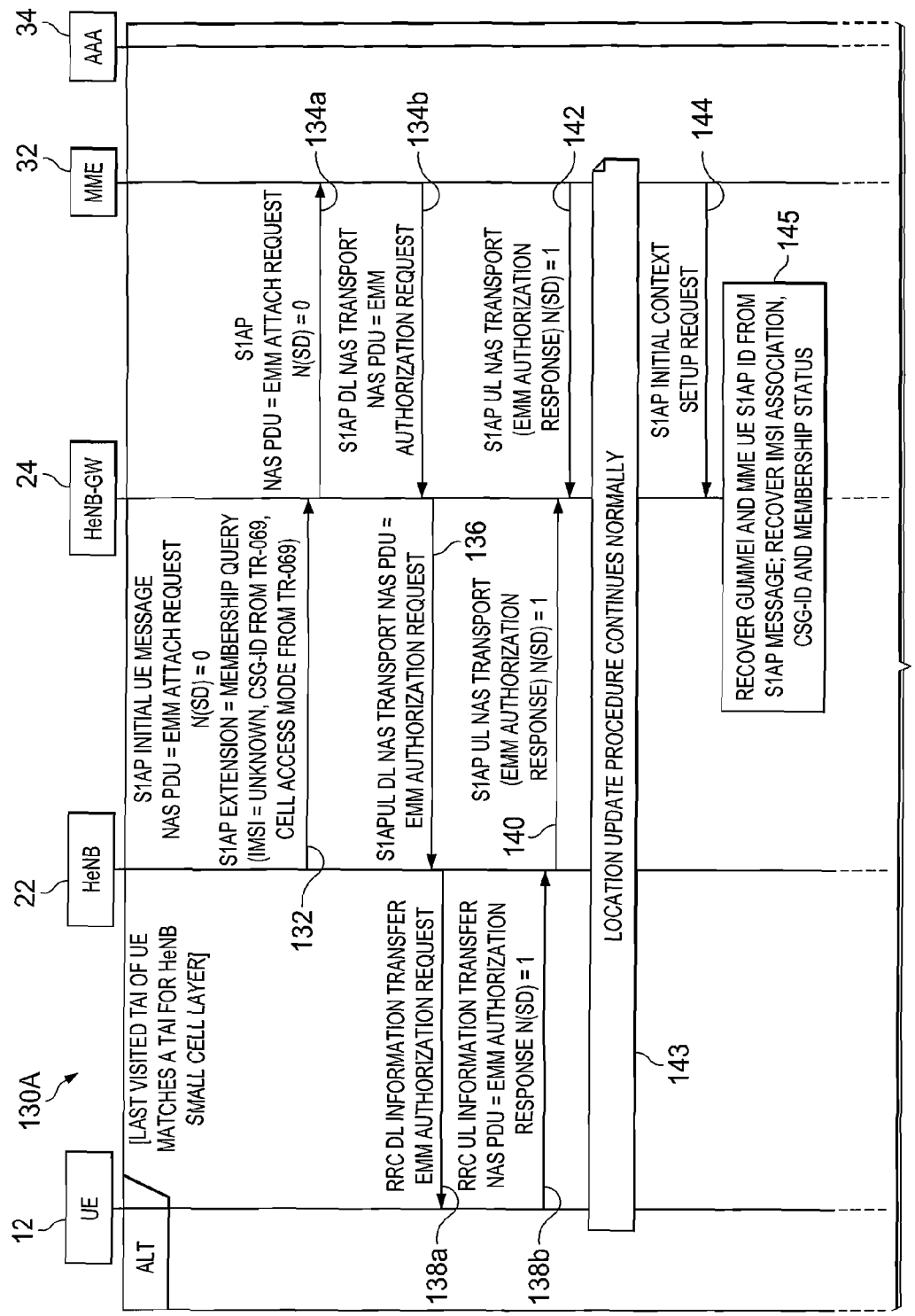

Referring now to FIGS. 6A-6B, FIGS. 6A-6B are simplified flow diagrams 130A-130B, respectively, that illustrates example flows and activities associated with another possible alternative to the determination made by HeNB 22 as shown in FIG. 2 regarding whether UE 12 is transitioning to HeNB 22 from macro network 30 or from another HeNB in the small cell network including HeNB 22. The possible alternative shown in the simplified flow diagrams 130A-130B of FIGS. 6A-6B, respectively, illustrates example flows and activities corresponding to a determination by HeNB 22 that UE 12 has transitioned to HeNB 22 from another HeNB in the small cell network that includes HeNB 22 (e.g., the last visited TAI received from UE matches or is equal to a TAI for the small cell network). As shown in FIG. 6A, based on the determination, HeNB 22 can query HeNB-GW 24 at 132 with a membership query to determine if the subscriber associated with UE 12 is a member of the CSG provisioned for HeNB 22. The membership query can be appended to an S1AP initial UE message communicated to HeNB-GW 24 at 132 with the S1AP proprietary extension for the membership query including the CSG-ID for the CSG provisioned for HeNB 22 and the cell access mode provisioned for HeNB 22. For the S1AP message, a NAS PDU field in the S1AP message may be embedded with the EMM-attach request received from UE 12 having an N(SD) =0.

Note that the IMSI of the subscriber associated with UE 12 may be unknown to HeNBs for transitions between HeNBs in the small cell network, but may be known to MME 32, as MME 32 previously authenticated UE 12 upon its transition into the small cell network from macro network 30. The EMM-attach request may include an old GUTI including a GUMMEI identifying an MME that had previously allocated the GUTI, which may or may not have been MME 32 (e.g., if UE 12 moves from another macro network or another MME within macro network 30) and an M-TMSI, which also identifies UE 12 within the MME that allocated the GUTI.

At 134a, HeNB-GW 24 can communicate an S1AP UL NAS transport message to MME 32 having a NAS PDU field embedded with the EMM-attach request. Because the N(SD) is set to '0' for the EMM-attach request, MME 32 may accept the attach request. At 134b, MME 32 can communicate EMM-authorization request embedded an S1AP DL NAS transport message. At 136, HeNB-GW 24 can communicate the EMM-authorization request to HeNB 22 in another S1AP DL NAS transport message. At 138a, HeNB 22 can communicate an RRC DL information transfer message including the EMM-authorization request to UE 12. UE 12 can respond to the authorization request with an EMM-authorization response having an N(SD)=1, as shown at 138b. The EMM-authorization response may be embedded in the NAS PDU field of an RRC UL information transfer message communicated from UE 12 to HeNB 22. At 140, HeNB 22 may communicate the EMM-authorization response to HeNB-GW 24 in an S1AP UL NAS transport message. At 142, HeNB-GW 24 can communicate the EMM-authorization response to MME 32 in another S1AP UL NAS transport message. Because the EMM-authorization response includes an N(SD)=1, which corresponds to an appropriate sequence number following the EMM-attach request of flow 134a, the EMM-authorization response is accepted by MME 32. Following acceptance of the EMM-authorization response, the location update procedure for UE 12 can continue in a normal manner at 143 between UE 12 and MME 32.

Following the location update, MME 32 can communicate an S1AP initial context setup request message to HeNB-GW 24, as shown at 144. The S1AP message may include the GUMMEI identifying MME 32 and the MME UE S1AP ID identifying UE 12 within MME 32. At 145, HeNB-GW 24 can recover the GUMMEI and MME UE S1AP ID from the S1AP message and may use these identifiers to recover an association stored in HeNB-GW for the GUMMEI+ MME UE S1AP ID associated with the IMSI of the subscriber associated with UE 12, the CSG-ID for the CSG provisioned for HeNB 22 and membership status of the subscriber within the CSG. The recovered association can be used to determine the membership status of the subscriber associated with UE 12 in the CSG provisioned for HeNB 22, also shown at 145.

The flows and activities 130A from FIG. 6A may continue to flows and activities 130B shown in FIG. 6B. In another possible alternative, the CSG-ID included in the membership query from flow 132 may not match the CSG-ID for the stored IMSI association, which may indicate that the previous HeNB from which UE 12 transitioned was provisioned with a different CSG than the CSG provisioned for HeNB 22. Based on the nonmatching CSG-IDs for the IMSI, HeNB-GW 24 may communicate an access request message to AAA element 34 at 146a, which may include the IMSI and the CSG-ID for the CSG provisioned for HeNB 22. At 146b, AAA element 34 can communicate an access response message to HeNB-GW 24 including the membership status for the IMSI (e.g., the subscriber associated with UE 12).

At 94, HeNB-GW 24 can deliver a membership response to HeNB 22 using an S1AP proprietary extension to an S1AP initial context setup request message; the membership response can indicate whether or not UE 12 is a member of the CSG provisioned for HeNB 22. The S1AP proprietary extension for the membership response may include the IMSI of the subscriber associated with UE 12, the CSG-ID of the CSG provisioned for HeNB 22, the cell access mode provisioned for HeNB 22 for the corresponding CSG and the membership status of the subscriber associated with UE 12 in the CSG.

At 149, HeNB 22 can provide resource to UE 12 based on whether or not the subscriber associated with UE 12 is a member of the CSG provisioned for HeNB 22 and based additionally on the access mode provisioned for HeNB 22 (e.g., Closed, Hybrid). Based on a determination that HeNB 22 can provide resources to UE 12 (e.g., either on an enhanced or non-enhanced basis, depending on access mode), security mode control procedures between UE 12 and HeNB 22 may continue as normal at 150. Following the security mode procedures, HeNB 22 can communicate an S1AP initial context setup response message to HeNB-GW 24 at 152. The S1AP initial context setup response message can be communicated from HeNB-GW 24 to MME 32 at 154. At 156, UE 12 can communicate an EMM-attach complete to HeNB 22, which can communicate the message at 158 using S1AP signaling to HeNB-GW 24, which can further communicate the message at 1160 using S1AP signaling to MME 32.

Although not outlined in their entirety in FIGS. 6A-6B, it should be understood that the membership determination flows and activities as discussed in FIGS. 4-5 can be equally applied within the flows and activities discussed in FIGS. 6A-6B for UE transitions between HeNBs in a small cell network.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding flows and activities have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for a communication network comprising:
   receiving, by a first Home eNodeB (HeNB), a first attach request from a user equipment (UE) for attaching a subscriber associated with the UE to a small cell network;
   determining whether the subscriber has transitioned into the small cell network from a macro cell network;
   exchanging, based on the determination, a first pair of messages between the first HeNB and the UE to determine an International Mobile Subscriber Identity (IMSI) of the subscriber;
   exchanging, based on the determination, one or more second pairs of messages between the first HeNB and the UE to advance a sequence number for Non-Access Stratum (NAS) messages for the UE to a value corresponding to a received sequence number for the first attach request from the UE;
   receiving, by a second HeNB, a second attach request from the UE for attaching the subscriber to the small cell network;
   determining whether the subscriber has transitioned to the second HeNB from another HeNB in the small cell network; and
   retrieving, by a Home eNodeB gateway (HeNB-GW), the IMSI of the subscriber by recovering an association of the IMSI with a Globally Unique Mobility Management Entity Identity (GUMMEI) and a Mobility Management Entity UE S1AP Identity (MME UE S1AP ID) for the subscriber if the subscriber has transitioned to the second HeNB from another HeNB in the small cell network.

2. The method of claim 1, wherein the first pair of messages and the one or more second pairs of messages include:
   an Evolved Packet System Mobility Management Identity (EMM-ID) Request message; and
   an EMM-ID Response message.

3. The method of claim 1, wherein the determining that the subscriber has transitioned into the small cell network from the macro cell network includes determining that a source tracking area identity (TAI) for the subscriber does not match a corresponding TAI provisioned for the first HeNB.

4. The method of claim 1, wherein the first HeNB is provisioned, at least in part, to provide resources for a closed subscriber group (CSG), the method further comprising
   determining whether the subscriber is a member of the CSG by performing at least one of:
     querying a service with the IMSI of the subscriber and an identifier for the CSG to determine if the subscriber is a member of the CSG;
     querying a service with the IMSI of the subscriber and an identifier for the first HeNB to determine if the subscriber is a member of the CSG; and
     comparing the IMSI of the subscriber to a list of authorized subscribers for the CSG; and
   communicating to the first HeNB whether the subscriber is a member of the CSG to provide resources to the subscriber, wherein the resources provided to the subscriber can be adjusted based on an access mode of the first HeNB and whether the subscriber is a member of the CSG.

5. The method of claim 4, further comprising:
associating the IMSI of the subscriber with a Globally Unique Mobility Management Entity Identity (GUMMEI) and a Mobility Management Entity UE S1AP Identity (MME UE S1AP ID) for the subscriber if the subscriber is a member of the CSG; and
storing the association of the IMSI in combination with an identifier for the CSG.

6. The method of claim 1, wherein the determining that the subscriber has transitioned to the second HeNB from another HeNB in the small cell network includes matching a source tracking area identity (TAI) for the subscriber to a corresponding TAI provisioned for the small cell network.

7. The method of claim 1, wherein the second HeNB is provisioned, at least in part, to provide resources for a closed subscriber group (CSG), the method further comprising:
determining whether the subscriber is a member of the CSG by performing at least one of:
querying a service with the IMSI of the subscriber and an identifier for the CSG to determine if the subscriber is a member of the CSG;
querying a service with the IMSI of the subscriber and an identifier for the second HeNB to determine if the subscriber is a member of the CSG; and
comparing the IMSI of the subscriber to a list of authorized subscribers for the CSG to determine if the subscriber is a member of the CSG; and
communicating to the second HeNB whether the subscriber is a member of the CSG to provide resources to the subscriber, wherein the resources provided to the subscriber can be adjusted based on an access mode of the second HeNB and whether the subscriber is a member of the CSG.

8. The method of claim 7, wherein the association of the IMSI with the GUMMEI and the MME UE S1AP ID includes an association with an identifier for the CSG.

9. One or more non-transitory tangible media encoding logic that include instructions for execution that, when executed by a processor, is operable to perform operations comprising:
receiving, by a first Home eNodeB (HeNB), a first attach request from a user equipment (UE) for attaching a subscriber associated with the UE to a small cell network;
determining whether the subscriber has transitioned into the small cell network from a macro cell network;
exchanging, based on the determination, a first pair of messages between the first HeNB and the UE to determine an International Mobile Subscriber Identity (IMSI) of the subscriber;
exchanging, based on the determination, one or more second pairs of messages between the first HeNB and the UE to advance a sequence number for Non-Access Stratum (NAS) messages for the UE to a value corresponding to a received sequence number for the first attach request from the UE;
receiving, by a second HeNB, a second attach request from the UE for attaching the subscriber to the small cell network;
determining whether the subscriber has transitioned to the second HeNB from another HeNB in the small cell network; and
retrieving, by a Home eNodeB gateway (HeNB-GW), the IMSI of the subscriber by recovering an association of the IMSI with a Globally Unique Mobility Management Entity Identity (GUMMEI) and a Mobility Management Entity UE S1AP Identity (MME UE S1AP ID) for the subscriber if the subscriber has transitioned to the second HeNB from another HeNB in the small cell network.

10. The media of claim 9, wherein the first pair of messages and the one or more second pairs of messages include:
an Evolved Packet System Mobility Management Identity (EMM-ID) Request message; and
an EMM-ID Response message.

11. The media of claim 9, wherein the determining that the subscriber has transitioned into the small cell network from the macro cell network includes determining that a source tracking area identity (TAI) for the subscriber does not match a corresponding TAI provisioned for the first HeNB.

12. The media of claim 9, wherein the first HeNB is provisioned, at least in part, to provide resources for a closed subscriber group (CSG) and wherein the operations further comprise:
determining whether the subscriber is a member of the CSG by performing at least one of:
querying a service with the IMSI of the subscriber and an identifier for the CSG to determine if the subscriber is a member of the CSG;
querying a service with the IMSI of the subscriber and an identifier for the first HeNB to determine if the subscriber is a member of the CSG; and
comparing the IMSI of the subscriber to a list of authorized subscribers for the CSG; and
communicating to the first HeNB whether the subscriber is a member of the CSG to provide resources to the subscriber, wherein the resources provided to the subscriber can be adjusted based on an access mode of the first HeNB and whether the subscriber is a member of the CSG.

13. The media of claim 12, wherein the operations further comprise:
associating the IMSI of the subscriber with a Globally Unique Mobility Management Entity Identity (GUMMEI) and a Mobility Management Entity UE S1AP Identity (MME UE S1AP ID) for the subscriber if the subscriber is a member of the CSG; and
storing the association of the IMSI in combination with an identifier for the CSG.

14. The media of claim 9, wherein the determining that the subscriber has transitioned to the second HeNB from another HeNB in the small cell network includes matching a source tracking area identity (TAI) for the subscriber to a corresponding TAI provisioned for the small cell network.

15. An apparatus, comprising:
a first Home eNode B (HeNB);
a memory element for storing data; and
a processor that executes instructions associated with the data, wherein the processor and memory element cooperate such that the apparatus is configured for:
receiving a first attach request from a user equipment (UE) for attaching a subscriber associated with the UE to a small cell network;
determining whether the subscriber has transitioned into the small cell network from a macro cell network;
exchanging, based on the determination, a first pair of messages between the first HeNB and the UE to determine an International Mobile Subscriber Identity (IMSI) of the subscriber;
exchanging, based on the determination, one or more second pairs of messages between the first HeNB and the UE to advance a sequence number for Non-Access Stratum (NAS) messages for the UE to a value corresponding to a received sequence number for the first attach request from the UE;

receiving, by a second HeNB, a second attach request from the UE for attaching the subscriber to the small cell network;

determining whether the subscriber has transitioned to the second HeNB from another HeNB in the small cell network; and retrieving, by a Home eNodeB gateway (HeNB-GW), the IMSI of the subscriber by recovering an association of the IMSI with a Globally Unique Mobility Management Entity Identity (GUMMEI) and a Mobility Management Entity UE S1AP Identity (MME UE S1AP ID) for the subscriber if the subscriber has transitioned to the second HeNB from another HeNB in the small cell network.

16. The apparatus of claim 15, wherein the first pair of messages and the one or more second pairs of messages include:

an Evolved Packet System Mobility Management Identity (EMM-ID) Request message; and an EMM-ID Response message.

17. The apparatus of claim 15, wherein the determining that the subscriber has transitioned into the small cell network from the macro cell network includes determining that a source tracking area identity (TAI) for the subscriber does not match a corresponding TAI provisioned for the first HeNB.

18. The apparatus of claim 15, wherein the first HeNB is provisioned, at least in part, to provide resources for a closed subscriber group (CSG), the apparatus being further configured for:

determining whether the subscriber is a member of the CSG by performing at least one of:

querying a service with the IMSI of the subscriber and an identifier for the CSG to determine if the subscriber is a member of the CSG;

querying a service with the IMSI of the subscriber and an identifier for the first HeNB to determine if the subscriber is a member of the CSG; and comparing the IMSI of the subscriber to a list of authorized subscribers for the CSG; and communicating to the first HeNB whether the subscriber is a member of the CSG to provide resources to the subscriber, wherein the resources provided to the subscriber can be adjusted based on an access mode of the first HeNB and whether the subscriber is a member of the CSG.

* * * * *